(12) United States Patent
Sarukkai

(10) Patent No.: US 6,775,695 B1
(45) Date of Patent: Aug. 10, 2004

(54) CLIENT SESSION DEPTH BASED CACHING IN PROXY SERVERS

(75) Inventor: Sekhar R. Sarukkai, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/431,544

(22) Filed: Oct. 29, 1999

(51) Int. Cl.[7] .................. G06F 15/16; G06F 15/173; G06F 12/00; G06F 17/30; G06F 7/00
(52) U.S. Cl. .................. 709/219; 709/224; 711/159; 707/2
(58) Field of Search .................. 711/118, 120, 711/122, 126–140; 709/219, 203, 216

(56) References Cited

U.S. PATENT DOCUMENTS

| | | | | |
|---|---|---|---|---|
| 4,928,239 A | * | 5/1990 | Baum et al. | 364/200 |
| 5,394,531 A | * | 2/1995 | Smith | 395/425 |
| 5,627,994 A | * | 5/1997 | Levy et al. | 395/477 |
| 5,950,205 A | * | 9/1999 | Aviani, Jr. | 707/103 |
| 6,023,726 A | * | 2/2000 | Saksena | 709/219 |
| 6,324,565 B1 | * | 11/2001 | Holt, III | 709/203 |
| 6,338,117 B1 | * | 1/2002 | Challenger et al. | 711/122 |

OTHER PUBLICATIONS

A. Luotonen and K. Altis. "World–wide web proxies" Proceedings of the First International Conference on the WWW, May 1994.*

Hahn, U. Dilling, W. Kaletta, D. Mass Storage Systems, 1999. 16th IEEE Symposium; pp.:128–140 Mar. 15–18, 1999 San Diego, CA, USA.*

Pei, Cao and Sandy Irani, :Cost–Aware WWW Proxy Caching Algorithms, Proceedings of the 1997 USENIX Symposium on INternet Technology and Systems, pp. 193–206, Dec. 1997.*

K. Froese and R. B. Bunt. The effect of client caching on file server workloads. In Proc. of the 29th Hawaii International Conference on System Sciences, pp. 150–159, Jan. 1996.*

* cited by examiner

Primary Examiner—Dung C. Dinh
Assistant Examiner—Anita Choudhary (57) ABSTRACT

Methods and apparatus are provided for controlling document transfer between a web server coupled to a wide area network, such as the Internet, and a client coupled to the wide area network. The method includes the steps of monitoring the number of documents requested by a client in a current session, placing a document requested by the client in a file cache according to a caching algorithm that is based, at least in part, on the number of documents requested by the client in the current session, and accessing the document in the file cache when the document is requested subsequently by the client. The file cache may be associated with a proxy server that couples a local area network to the wide area network.

29 Claims, 5 Drawing Sheets

CLIENT SESSION DEPTH BASED CACHING IN PROXY SERVERS

FIELD OF THE INVENTION

This invention relates to document caching in proxy servers and, more particularly, to techniques for achieving improved cache performance by incorporating client session depth as a factor in a caching algorithm.

BACKGROUND OF THE INVENTION

Local area networks in corporations, universities and other facilities are typically connected to a wide area network, known as the Internet, through a proxy server. The proxy server functions as an interface between multiple clients on the local area network and the Internet. Client requests are formatted by the proxy server and forwarded to the appropriate web server on the Internet. The requested information is returned to the client through the proxy server.

A file cache may be associated with the proxy server. The file cache is a device for storage of documents that are likely to be reused by clients on the local area network. The file cache may have the form of memory in the proxy server, a hard disk associated with the proxy server, or any other type of memory. When a requested document is present in the file cache, in can be retrieved with lower latency and at lower cost as compared with obtaining the same document from a remote web server. In addition, Internet traffic is reduced.

A critical factor in the effectiveness of a file cache is the algorithm or policy used for placing documents in the file cache. Clearly, a file cache is effective only if the documents contained in it are reused by the clients on the local area network, preferably multiple times. However, since it cannot be known in advance whether any particular document will be reused, caching policies rely upon predictions of document reuse.

There have been a number of studies that observed that the document access patterns in web servers and proxy servers follow a Zipf distribution in characteristics such as document access count and size. The observations indicate that there are a few "hot" documents that are accessed repeatedly, and then there are a large number of documents that are accessed a few times.

This long-tailed nature of the access frequency of documents has led to many optimizations tailored to such distributions. Many cache replacement policies that optimize for document hit rate or byte-hit rate have been proposed.

Most studies comparing various caching algorithms on the Internet indicate that a size-aware greedy-dual algorithm works best for increasing document hit rate, while some frequency aware schemes work best for increasing byte-hit rate. A perfect Least Frequently Used (LFU) replacement scheme that has information about all documents accessed and their access count is considered to be the most effective for increasing byte-hit rates, but least practical of all replacement schemes, since it requires complete knowledge of all documents accessed, even if the document has been evicted from the cache. A more practical implementation of a frequency based scheme that keeps track of frequency of access of only documents currently in the file cache (in-cache LFU) does poorly compared to most other schemes and is a poor choice for replacement algorithms. In fact, of the more practically realizable solutions, a Least Recently Used (LRU) algorithm has been shown to be reasonably effective in increasing byte-hit rates, though it performs suboptimally in the case of document hit rates.

Despite extensive studies and analysis, document hit rates are typically below 50% in proxy servers, and the hit rates on smaller cache sizes are much lower. Accordingly, there is a need for improved techniques for operation of file caches in proxy servers.

SUMMARY OF THE INVENTION

In accordance with a first aspect of the invention, a method is provided for controlling document transfer in data communication apparatus for document transfer between a web server coupled to a wide area network and a client coupled to the wide area network. The method comprises the steps of monitoring the number of documents requested by a client in a current session, placing a document requested by the client in a file cache according to a caching algorithm that is based, at least in part, on the number of documents requested by the client in the current session, and accessing the document in the file cache when the document is requested subsequently by the client. The wide area network is typically the Internet.

The file cache is preferably associated with a proxy server that is coupled between the wide area network and a local area network that serves a plurality of clients. Alternatively, the file cache may be associated with a controller in a network element, such as a router or a bridge.

The caching algorithm for placing the document in the file cache preferably includes a function that decreases as the number of documents requested by the client in the(current session increases. The function may decrease continuously or in one or more steps as the number of documents requested by the client in the current session increases. In one embodiment, the function has a value of zero, i.e., the cache is bypassed, when the number of documents requested by the client in the current session exceeds a predetermined number. When the number of documents requested in the current session is less than or equal to the predetermined number, any desired caching algorithm may be utilized for placing the document in the file cache. The caching algorithm for placing the document in the file cache may incorporate a replacement algorithm, such as a size-based algorithm, a least recently used algorithm or a least frequently used algorithm.

The step of monitoring the number of documents requested may be performed across two or more web servers in the current session. In addition, the step of monitoring the number of documents requested may be performed across one or more timeouts in the current session.

According to another aspect of the invention, data communication apparatus is provided for coupling a local area network to a wide area network. The local area network interconnects a plurality of clients. The data communication apparatus comprises a file cache for storing documents requested by the clients from the wide area network, and a proxy server coupled between the local area network and the wide area network and coupled to the file cache. The proxy server comprises means for monitoring the number of documents requested by a client in a current session, means for placing a document requested by the client in the file cache according to a caching algorithm that is based, at least in part, on the number of documents requested by the client in the current session, and means for accessing the document in the file cache when the document is requested subsequently by one of the plurality of clients.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
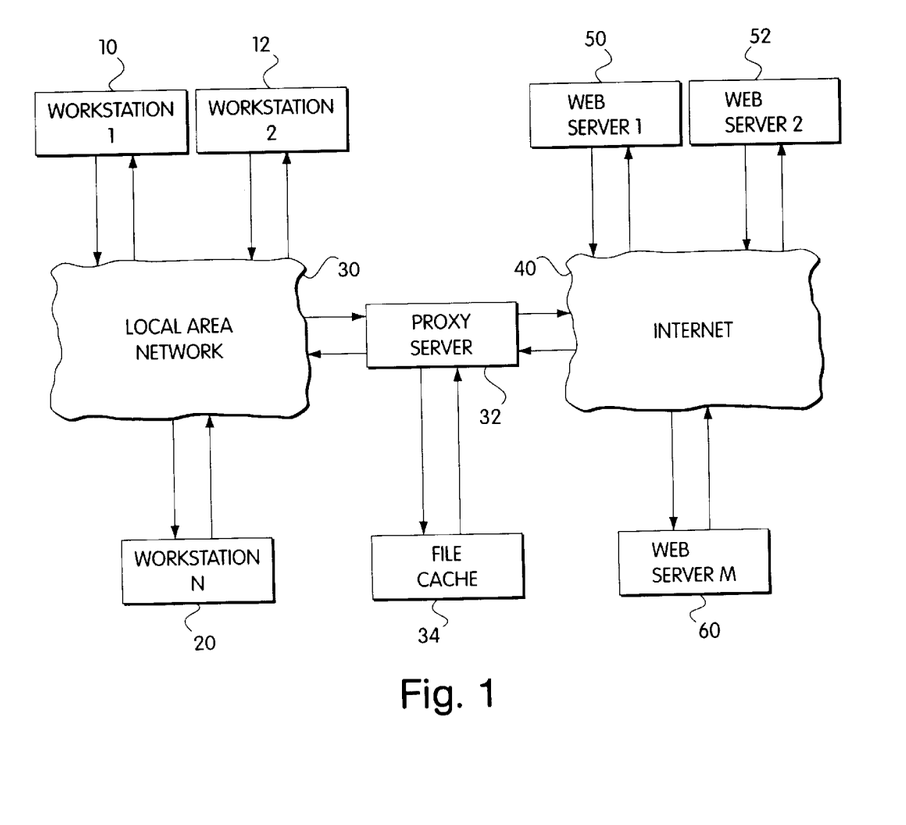
FIG. 1 is a block diagram of data communication apparatus in accordance with an embodiment of the invention.

A block diagram of an example of a data communication system suitable for implementing the present invention is shown in FIG. 1. Workstations 10, 12, . . . 20 are coupled to a local area network 30, such as may be present in a corporation, university or other facility. The local area network 30 is coupled through a proxy server 32 to the Internet 40. Web servers 50, 52, . . . 60 are coupled to the Internet 40. A file cache 34 is coupled to proxy server 32.

In operation, users at workstations 10, 12, . . . 20 request documents from one or more of web servers, 50, 52, . . . 60 connected to Internet 40. Each request is forwarded by local area network 30 through proxy server 32 and Internet 40 to the appropriate web server. The requested document is downloaded through Internet 40, proxy server 32 and local area network 30 to the requesting workstation.

The proxy server 32 serves as an interface between local area network 30 and Internet 40. Workstations 10, 12, . . . 20 are clients of proxy server 32. File cache 34 is used for storage of documents that have a probability of reuse by a client connected to local area network 30. When a requested document can be accessed in file cache 34 rather than in one of the web servers connected to Internet 40, the latency in retrieving the document is reduced. In addition, Internet traffic and cost to the proprietor of the local area network are reduced.

When a document is requested by the proxy server 32 from one of the web servers, a decision must be made as to whether to place the document in file cache 34. The decision is based on an algorithm which represents an estimate of the likelihood that the document will be reused. Clearly, no advantage is gained by placing in file cache 34 documents that have little or no likelihood of reuse.

There have been a number of efforts to extract regularities in Internet workloads from seemingly irregular workload characteristics. Two irregularities observed in a number of workloads follow a Zipf-like distribution. The Zipf distribution is described by G. K. Zipf in "Human Behavior and the Principle of Least Effort," Addison-Wesley, Cambridge, Mass. 1949.

Figure 2:
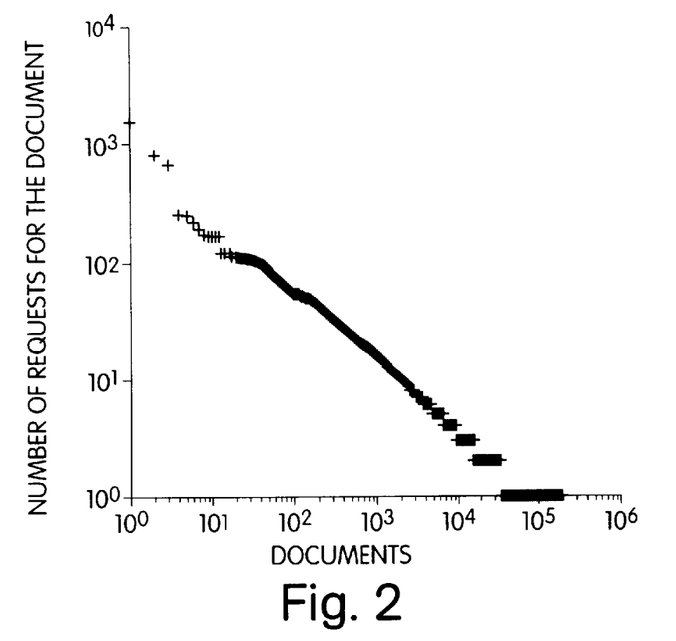
FIG. 2 is a graph of number of requests for a document as a function of documents requested.

One of the most commonly observed and cited characteristics of Internet workloads is the Zipf distribution of document accesses. It has been observed in a number of independent studies that the popularity of documents, as measured by the number of requests, follows a Zipf distribution. That is, there are a number of documents that are accessed a few times, while there are a few "hot" documents that are accessed a large number of times. FIG. 2 shows a graph of document popularity for traces collected from the Hewlett-Packard Laboratories proxy on June 1, 1998. The traces are logs of client sessions on the Internet. The X axis represents each unique document referenced in the trace, and the Y axis corresponds to the number of times the documents have been accessed, plotted in a log—log scale.

A different way of looking at web surfing and document accesses is to view it from the perspective of client behavior patterns. Huberman et al. in "Strong Regularities in World Wide Web Surfing," *Journal of Science*, Vol. 280, Apr. 1998, observe in their "surfing law" that models of client surfing activity can be built in very similar lines to real options in financial economics. This perspective provides a rich normative model of web surfing and predicts the number of links that a user follows before deciding it would not be worthwhile to proceed further. The random variable that denotes the number of links that a user follows before stopping is shown to exhibit a long tail.

Figure 3:
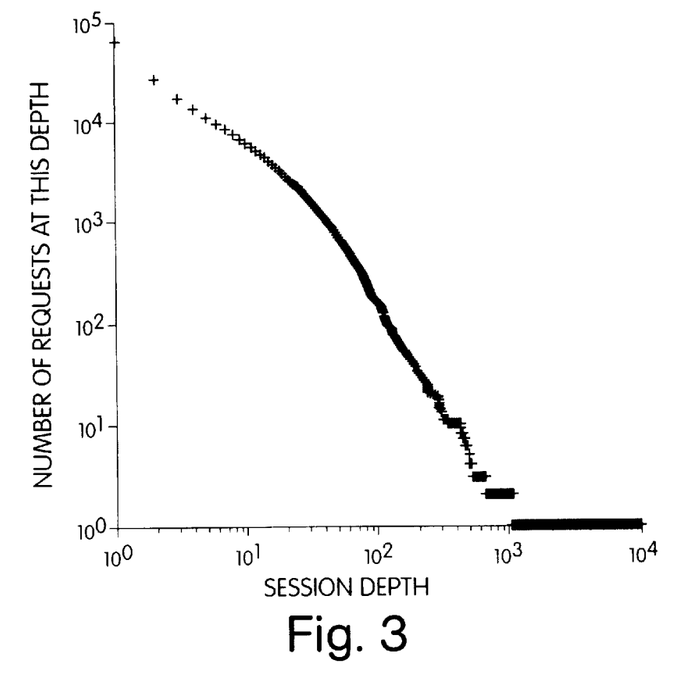
FIG. 3 is a graph of number of documents requests as a function of session depth.

From the perspective of analyzing traces to determine the number of links followed in a client session, the work by Huberman et al. considers a session to be consecutive hits to the same server by the client. The analysis of each of these session lengths reveals a Zipf distribution. However, sessions are defined herein to include multiple servers accessed in a single session and to include long periods of inactivity from the clients. This captures the true nature of client surfing, which often crosses multiple server boundaries. Even with this more general definition of sessions, a similar pattern in session length distribution is observed. FIG. 3 is a plot of session depth versus number of requests at that depth in a session for the same traces plotted in FIG. 2. The X axis corresponds to session depth, and the Y axis corresponds to the number of documents requested at that depth, plotted on a log—log scale. Session depth may be defined as the number of documents requested by the client in the current session. It is clear that this characteristic also follows a long-tailed distribution, implying that most users follow very few links before perceiving that they have found all the information that is to be found.

Figure 4:
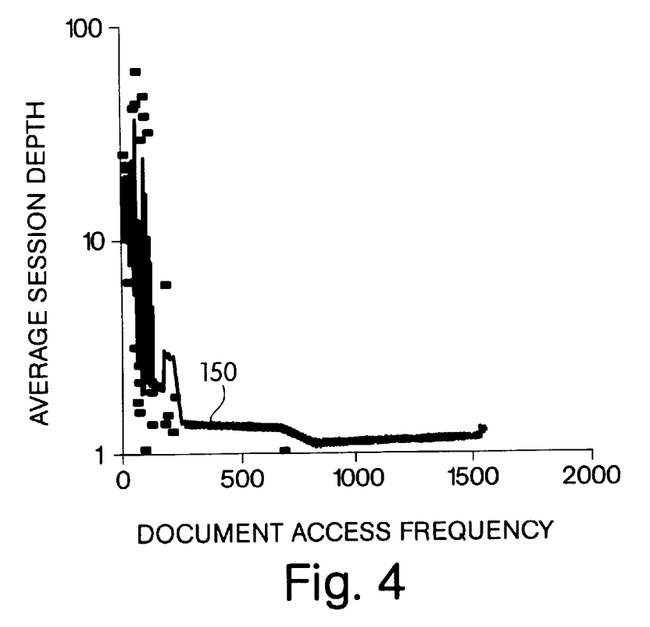
FIG. 4 is a graph of average session depth as a function of document access frequency.

In Huberman et al. it is shown that a spreading activation model successfully predicts the expected probability distribution of the number of hits to documents. The correlation between session depth and the frequency of access to a document is now discussed. FIG. 4 highlights the correlation between frequently accessed documents and the session depth at which the document is accessed. The X axis corresponds to the frequency of the document access, and the Y axis corresponds to the average depth at which the document is accessed. A trend line 150 that plots a moving average of the last four data points is also shown. As can be seen in FIG. 4, for documents that have low frequency of access (closer to the origin), the average depth is much more spread and large in comparison with documents that have been accessed many more times (toward the right end of the X axis). In fact, the twenty most frequently accessed documents have an average session depth of less than 10, and the two most frequently accessed documents have an average session depth of less than 1.5. Equally important is the fact that documents that are accessed very few times, say less than ten times, have session depth averages well above 10. This correlation can be exploited in caching policies, as described below.

Most caching studies have indicated that document hit rates are relatively low in web caches, and byte-hit rates are lower still. Byte-hit rates are affected by the sizes of the documents accessed, whereas document hit rates are not. For example, a hit on a large document followed by misses on three small documents would give a document hit rate of 25%, but would give a higher byte-hit rate. Since many institutions pay for network traffic, and since access to local disks in the cache does not always necessarily result in better quality of service to the client, it can be argued that byte-hit rates are a more important metric for measuring cache performance than document hit rates. While the Greedy Dual Size (GDS) algorithm and its extensions have been shown to be very effective for improving document hit rates in comparison to the LRU algorithm, byte-hit rates of the best byte-hit rate optimized GDS algorithm are almost identical to the performance of the LRU algorithm. In fact, some studies have shown that the perfect LFU algorithm is perhaps the best scheme for caching. The main problem with using the perfect LFU algorithm is that it requires information on all the documents that are passed through the cache, even those that have been evicted, to make the decision on replacement strategy. This issue alone can inhibit widely deployable LFU-based caches, since in-cache LFU schemes have been shown to perform poorly.

Any scheme that can provide a good prediction of the likelihood of a document being reused even before it is brought into the cache, and without having any previous knowledge of the document, can go a long way toward making more optimal caching feasible. To this end, the correlation between session depth and access frequency described above is exploited to improve the efficacy of the cache replacement algorithms. There are two possible ways of incorporating session depth information in the replacement schemes. (1) A graceful implementation keeps track of the current session depth for each client and is based on the depth of the client. A document accessed early in a session is given a higher priority for being cached while one accessed later in a session is given lower priority. (2) Another approach is to simply bypass the cache for documents that are later in a session. While the first approach gracefully degrades the importance of documents later in a session, this approach allows simple implementation on top of existing caching schemes in proxy servers. The first approach was selected for all of the session-aware replacement schemes.

A number of different simulations were run to compare the performance impact of various cache replacement algorithms for different cache sizes. Major extensions to incorporate the GDS and LRU algorithms were made on the cache simulator developed by Pei Cao and available over the Internet at http://www.cs.wisc.edu/cao/webcache-simulator.html.

Six different versions of cache replacement algorithms are compared.

1) Greedy-Dual-Size (GDS). This algorithm is a variant of the greedy-dual algorithm, that sets the cost associated with each document to be K/size, where size is the size of the document. Any time a new document is brought into the cache, all the documents in the cache decrease their cost by some value. The cost associated with each document is used to determine the next document to be replaced. The document with the smallest cost is replaced. To optimize hit rates, K is set to one.

2) Greedy-Dual-Size+Frequency (GDSF). It has been observed that the greedy-dual-size algorithm optimizes the document hit rate at the expense of byte-hit rate since it penalizes large "hot" documents. Thus, large hot documents tend to get replaced more often than with frequency based schemes. In order to alleviate this problem, it has been proposed that the cost function be modified to incorporate the frequency in the numerator, so that as documents are accessed more frequently, their cost is increased. Hence, the cost function may be expressed as $(K' \times f)/size$, where f is the frequency of use. This scheme performs better than the GDS algorithm in both document hit and byte-hit rates, but performs only marginally better than LRU algorithms in byte-hit rates.

3) Greedy-Dual-Size+Sessions (GDSS). This algorithm incorporates session depth information in the greedy-dual framework, by having a term in the denominator that is a function of the current session depth. The larger the average depth of a document, the smaller its cost. The cost is expressed as $K/(size+k \times depth)$. The value of k is set to some value so as to account for the difference in scale between size and depth parameters.

4) Greedy-Dual-Size+Frequency+Sessions (GDSFS). This algorithm is a combination of the GDSF and GDSS algorithms. The cost is expressed as $(K' \times f)/(size+k \times depth)$. This algorithm performs the best by far, compared to all the previous algorithms in terms of byte-hit rate, while not penalizing document hit rate.

5) Least Recently Used (LRU). This algorithm replaces the documents that have not been used for the longest amount of time. It does not consider any other parameters. This algorithm has been shown to be less optimal with Internet workloads due to variation in size of document accesses and the long-tailed distribution of document accesses. However, byte-hit rates compare very favorably. This is the most popularly deployed caching algorithm in the Internet today.

6) LRU+Frequency+Sessions (LRUFS). This version of the LRU algorithm is analogous to the GDSFS algorithm. The simulation essentially uses the same GDS framework but sets the size of all documents to one, while still incorporating frequency in the numerator, as in the GDSF algorithm. This algorithm results in the best byte-hit rate performance of all the algorithms considered.

The cutoff version of session-depth awareness algorithms can be implemented without any modification to the caching algorithm, provided the application programming interface to the proxy server allows mechanisms for certain requests to completely bypass the cache.

The ideal byte-hit rate as measured with an infinite size cache is 24.4% and the document hit rate is 45.6%. This indicates that the reuse characteristics of larger documents are worse than for a document of average size. The goal of the comparison is to identify, the algorithm that comes as close as possible to the idealized byte-hit rate. Tables 1, 2 and 3 present results for the traces collected from Hewlett Packard Laboratories over three days, with a total of 951, 424 requests and nine gigabytes accessed. Table 1 compares the various GDS algorithms, for different cache sizes, expressed as a percentage of total unique bytes accessed.

TABLE 1

| Algorithm | 0.05% | 0.5% | 5% | 10% |
| --- | --- | --- | --- | --- |
| GDS | 3.58 | 6.95 | 13.4 | 15.7 |
| GDSF | 3.82 | 7.69 | 14.2 | 16.4 |
| GDSS | 4.30 | 8.51 | 14.8 | 16.8 |
| GDSFS | 4.70 | 9.29 | 15.3 | 17.0 |

Table 1 indicates that the GDSFS algorithm can provide up to 35% improvement in byte-hit rates for small cache sizes (1% of total unique bytes accessed) and about 10% improvement in performance for cache sizes above 1% up to cache sizes of about 10%. Using the GDSS algorithm yields about 20% improvement in performance for a small cache sizes (1%) and about 10% improvement for cache sizes up to 10% of the total unique bytes accessed. The GDSFS and GDSS algorithms both perform better than the GDSF algorithm. It should be established that the improvement in byte-hit rate does not come at the expense of large reductions in document hit rates. Table 2 compares the document hit rate for GDS and GDSFS. The document hit rates are comparable for both algorithms for different cache sizes, while the byte-hit rate shows significant improvements with GDSFS, as shown in Table 1.

TABLE 2

| Algorithm | 5% | 10% | 25% | 50% |
|---|---|---|---|---|
| GDS | 42.2 | 44.1 | 45.4 | 45.6 |
| GDSFS | 40.3 | 42.4 | 45.4 | 45.6 |

Tables 1 and 2 illustrate that the use of session depth information can indeed improve the byte-hit rates of the best algorithms that optimize document hit rates. The incorporation of session depth information in LRU-based algorithms is now considered to determine if there is any improvement in byte-hit rates. Since the LRU algorithm has a better byte-hit rate characteristic than the GDS algorithm, the improvements in document hit rate that may be achievable by using the session depth information on top of an LRU algorithm cannot be expected. Table 3 compares the byte-hit rates for the LRU and LRUFS algorithms. The results again indicate that significant benefit can be achieved by using session depth information for small cache sizes (0.5%). The improvement in byte-hit rate is about 10%, while for larger cache sizes the improvement in byte-hit rate is about 6%.

TABLE 3

| Algorithm | 0.05% | 0.5% | 5% | 10% | 25% |
|---|---|---|---|---|---|
| LRU | 4.47 | 9.30 | 16.11 | 18.29 | 21.2 |
| LRUFS | 5.02 | 10.23 | 17.11 | 19.35 | 22.0 |

Figure 5:
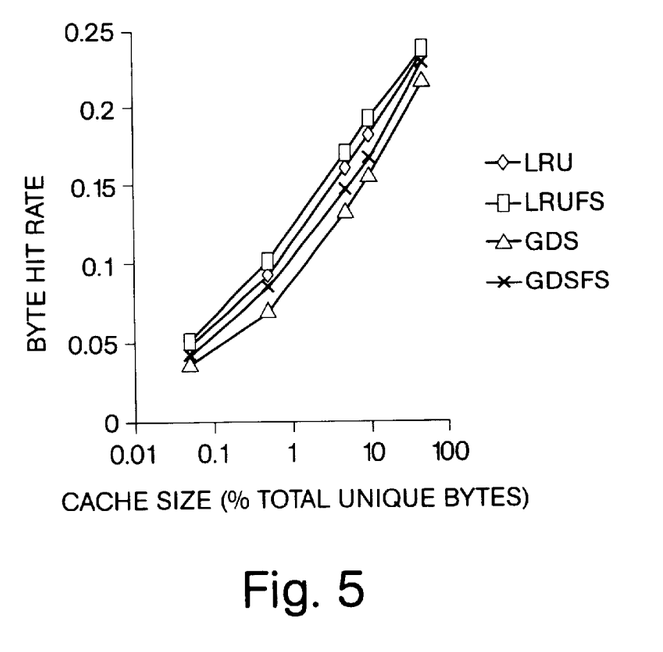
FIG. 5 is a graph of byte-hit rate as a function of cache size in units of percent of total unique bytes accessed for various caching algorithms.

FIG. 5 compares the byte-hit rates for GDS, GDSFS, LRU and LRUFS algorithms for cache sizes up to 50% of total unique bytes accessed. It may be observed that session depth based algorithms consistently perform better than their respective baseline algorithms. In addition, it can be seen that for cache sizes less than 1%, the GDSFS algorithm matches and slightly exceeds the performance of the LRU algorithm for byte-hit rate, while maintaining high document hit rates, as indicated in Table 2. Although the 6–10% improvement in byte-hit rates for the LRUFS algorithm seems modest, it can translate into significant savings in cost of network usage. For example, assume that the cost of network access varies uniformly between 10 cents and one dollar for one megabyte of transfer, based on location of reference. In this situation, the annual savings can amount to tens of thousands of dollars. For example, assuming 3 gigabytes of data is transferred daily to a group of 100 to 150 clients, served through a proxy server, the potential savings in cost is approximately $45,000. Since the content size can be expected to increase over time, any improvement in byte-hit rate becomes even more important.

The above results clearly indicate the benefit of session-depth information in both the GDS and LRU schemes up to a cache size of 10%. In addition, significant benefit is observed for smaller cache sizes. This improvement can be significant for in-memory caches. In-memory caches become more important as the number of total unique bytes accessed increases and as reduced client latency is desired.

It has been shown that a general session-depth aware algorithm can enable both GDS-based and LRU-based replacement algorithms to improve byte-hit rates. The improvements are consistent across varying cache sizes and across both algorithms. Improvements are obtained in the GDS algorithms with the incorporation of session depth information, while maintaining the strength of the GDS algorithm in obtaining high document hit rates. Consistent improvements are also obtained in byte-hit rate in LRU algorithms with the incorporation of session-depth information. With increasing awareness of non-cachable data and increasing support for delta encoding, caching can be expected to become even more important.

The session depth metric does not require individual document-based data structures to be modified or looked up for implementation. Since the only metric required is the current session depth of a client, a cookie-based scheme can work very well. In such an implementation, the proxy server sets the value of a cookie to signify that a client is in an ongoing session. The value of the cookie identifies the depth of the current session. The cookie can be made to expire after a fixed amount of time. Thus a request after a long duration of time is considered as a request of depth one in a new session.

Figure 6:
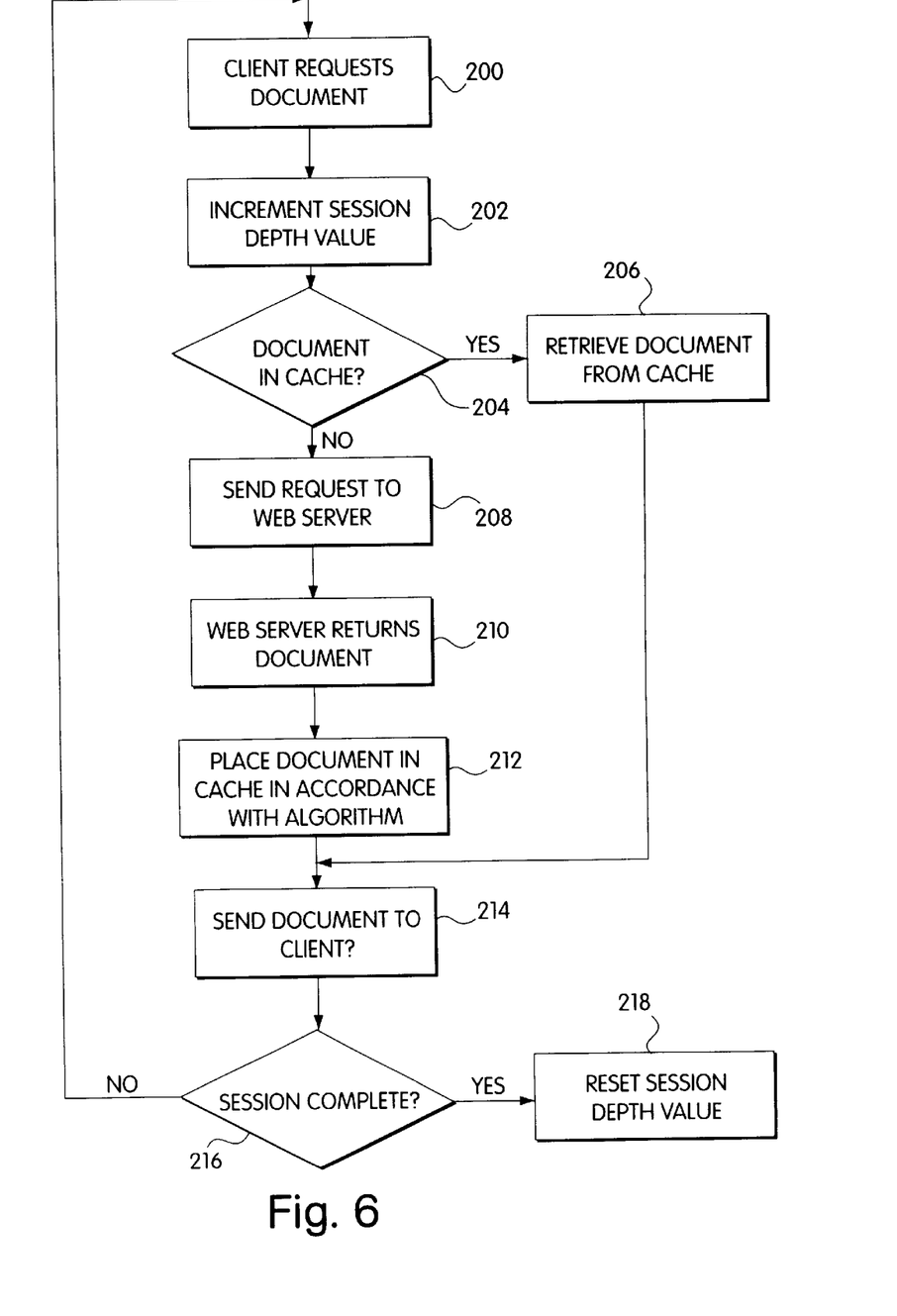
FIG. 6 is a flow chart of an example of a process for controlling a file cache in accordance with the invention.

An example of a process for controlling a file cache in accordance with the invention is shown in FIG. 6. In step 200, a client requests a document from a specified web server (FIG. 1). In step 202, a session depth value maintained by proxy server 32 is incremented. In step 204, a determination is made as to whether the requested document is present in file cache 34. If the document is present in the file cache, the document is retrieved in step 206. The process then proceeds to step 214, as described below.

If the requested document is not present in the file cache 34, a request is sent to the addressed web server on Internet 40 in step 208. The addressed web server returns the requested document in step 210. In step 212, the document is placed in the file cache in accordance with a selected algorithm which is based, at least in part, on session depth. Accordingly, the algorithm references the session depth value recorded in step 202 in determining whether the, document should be e din the file cache. The requested document is sent to the client in step 214. In step 216, a determination is made as to whether the current session is complete. If the current session is not complete, the process returns to step 200 to process another client document request. If the session is determined in step 216 to be complete, the session depth value is reset in step 218, thereby completing the processing of the current session.

The invention is described above in connection with a file cache associated with a proxy server. However, the invention is not limited to file caches associated with proxy servers. More generally, caching of documents which is based, at least in part, on the number of documents requested by the client in the current session may be performed at any convenient location in the network. For example, network routers and bridges may incorporate file caches. Furthermore, the caching algorithms described above may be applied to Internet accessing of documents by a single client, as well as to multiple clients interconnected by a local area network. Caching for a single client or for a group of clients may be localized or may be distributed in the wide area network.

Figure 7A:
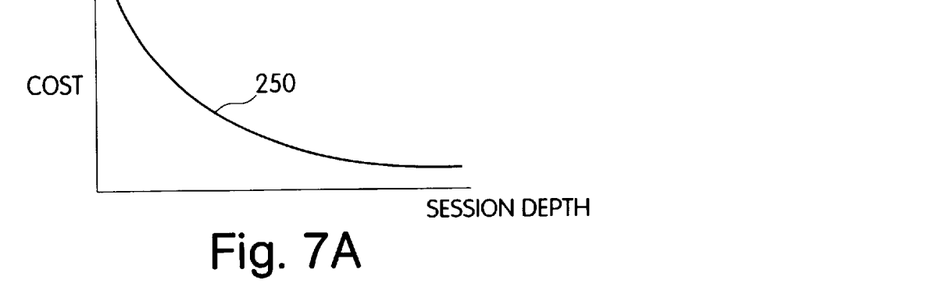
FIGS. 7A–7D are graphs of examples of cost functions as a function of session depth.
Figure 7B:
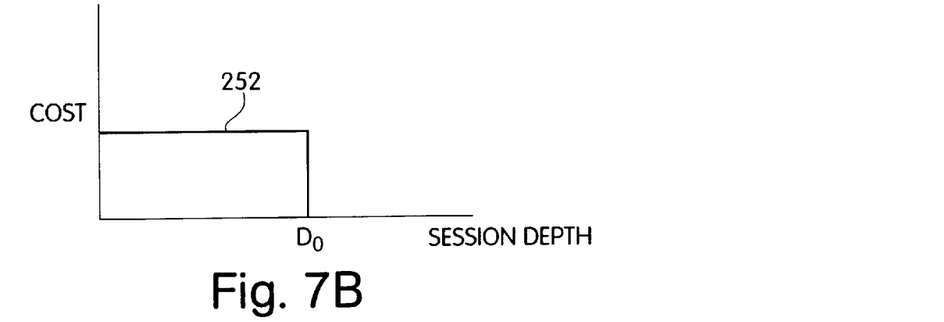
Figure 7C:
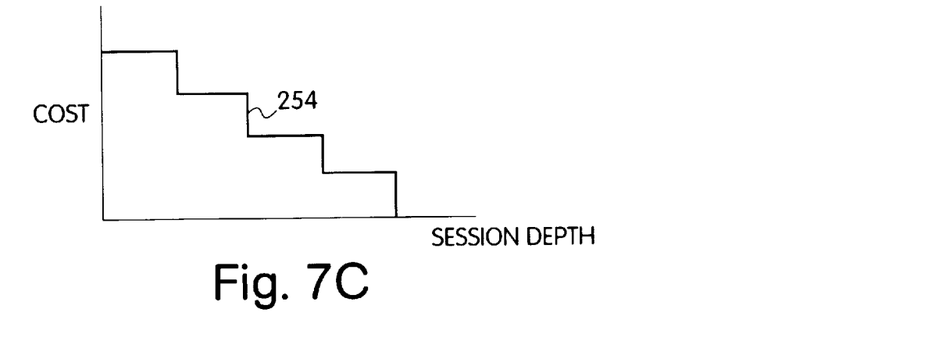
Figure 7D:
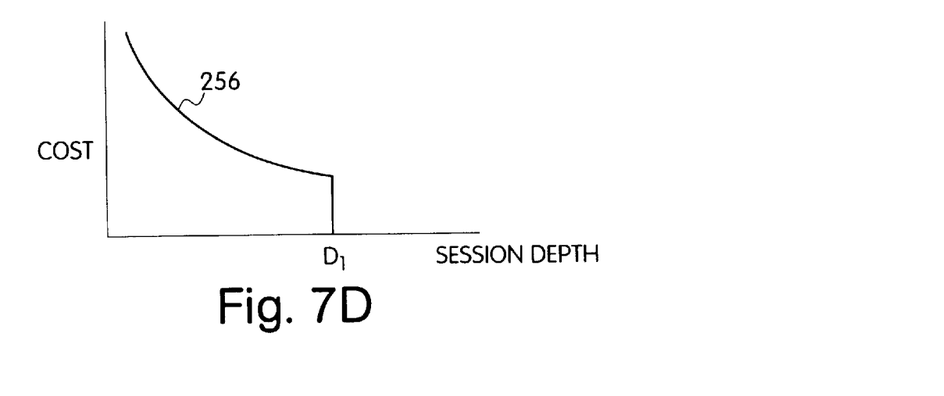

In accordance with a feature of the invention, the algorithm for placing documents in the file cache 34 is a function of session depth. A cost factor, which represents the cost of not placing the document in the file cache or of evicting a document from the cache, is preferably a decreasing function of session depth. It will be understood that a variety of different cost functions of session depth may be utilized within the scope of the present invention. Examples of suitable cost functions are illustrated in FIGS. 7A–7D. As shown in FIG. 7A, a cost function 250 is a continuously decreasing function of increasing session depth. As shown in FIG. 7B, a cost function 252 has a constant value for session depths less than or equal to a predetermined value $D_0$ and has a value of zero for session depths greater than the predetermined value $D_0$. When the cost value is zero, the cache is bypassed entirely. As shown in FIG. 7C, a cost function 254 decreases in steps from an initial value to a final value which may be zero or non-zero. As shown in FIG. 7D, a cost function 256 may decrease continuously for session depths less than or equal to a predetermined depth $D_1$ and may have a value of zero for depths greater than the predetermined depth $D_1$. Numerous variations, combinations and permutations of these cost functions may be utilized within the scope of the invention.

While there have been shown and described what are at present considered the preferred embodiments of the present invention, it will be obvious to those skilled in the art that various changes and modifications may be made therein without departing from the scope of the invention as defined by the appended claims.

What is claimed is:

1. Data communication apparatus for coupling a local area network to a wide area network, said local area network interconnecting a plurality of clients, comprising:

a file cache for storing documents requested by the clients from the wide area network; and a proxy server coupled between the local area network and the wide area network and coupled to the file cache, said proxy server comprising:

means for counting document requests submitted by the plurality of clients for retrieval of the documents, wherein for each client a respective number of document requests is accumulated from all requests made by the client for all documents;

means for selectively replacing documents in the file cache as a function of the respective numbers of documents requested by the clients; and means for accessing a document in the file cache when the document is requested by one of said plurality of clients.

2. Data communication apparatus as defined in claim 1, wherein the function used in selectively replacing documents in the file cache comprises a function that decreases as the respective number of documents requested by the client increases.

3. Data communication apparatus as defined in claim 1, wherein the function used in selectively replacing documents in the file cache comprises a function that decreases continuously as the respective number of documents requested by the client increases.

4. Data communication apparatus for document transfer between a web server coupled to a wide area network and a client coupled to the wide area network, comprising;

a file cache for storing documents requested by the client from the wide area network; and a cache controller comprising:

means for counting document requests submitted by the plurality of clients for retrieval of the documents, wherein for each client a respective number of document requests is accumulated from all requests made by the client for all documents;

means for selectively replacing documents in the file cache as a function of the respective numbers of documents requested by the clients; and means for accessing a document in the file cache when the document is requested by the client.

5. Data communication apparatus as defined in claim 4, wherein said controller comprises a proxy server coupled between a local area network and the wide area network.

6. A computer-implemented method for caching documents in a file cache, comprising:

counting document requests submitted by a plurality of clients for retrieval of the documents, wherein for each client a respective number of document requests is accumulated from all requests made by the client for all documents;

caching the documents in the file cache; and selectively replacing documents in the cache as a function of the respective numbers of document requests submitted by the clients.

7. The method of claim 6, further comprising selectively replacing documents in the cache as a function of the respective numbers of document requests submitted by the clients and sizes of the documents.

8. The method of claim 6, further comprising selectively replacing documents in the cache as a function of the respective numbers of document requests submitted by the client and relative frequencies of use of cached documents.

9. The method of claim 6, further comprising selectively replacing documents in the cache as a function of the respective numbers of document requests submitted by the clients and relative times of use of cached documents.

10. The method of claim 6, further comprising selectively bypassing the file cache with a document when the respective number of document requests submitted by the client is greater than a selected threshold.

11. The method of claim 6, further comprising:

associating respective cost values with documents in the file cache, wherein a magnitude of a cost value values indicates relative suitability for replacement; and deriving each cost value from a function that is inversely proportional to the respective number of document requests submitted by a client.

12. The method of claim 11, wherein the function for deriving each cost value is a generally continuous function that is inversely proportional to the respective number of document requests submitted by a client.

13. The method of claim 11, wherein the function for deriving each cost value is a single step function that is inversely proportional to the respective number of document requests submitted by a client.

14. The method of claim 11, wherein the function for deriving each cost value is a multi-step function that is inversely proportional to the respective number of document requests submitted by a client.

15. The method of claim 11, wherein the function for deriving each cost value is a combined generally continuous, single step function that is inversely proportional to the respective number of document requests submitted by a client.

16. An apparatus for caching documents in a file cache, comprising:

means for counting document requests submitted by a plurality of clients for retrieval of the documents, wherein for each client a respective number of document requests is accumulated from all requests made by the client for all documents;

means for caching the documents in the file cache; and means for selectively replacing documents in the cache as a function of the respective numbers of document requests submitted by the clients.

17. A processor-implemented method for caching documents requested by a plurality of clients in a file cache, comprising:

counting a respective total number of document requests by each client for all documents requested by the client over a selected time interval;

caching selected documents requested by the plurality of clients in the file cache;

associating with each cached document cost data indicative of the total number of document requests made by the client that requested the document at the time the document was placed in the file cache; and in response to a retrieved document by a document server for a request from one of the plurality of clients for a document not present in the cache, selecting a document in the cache for replacement as a function of the total number of document requests submitted by the one of the plurality of clients and the cost data associated with each cached document.

18. The method of claim 17, wherein the cost data includes respective sizes of the documents present in the file cache.

19. The method of claim 17, wherein the cost data includes respective, relative frequencies of use of cached documents.

20. The method of claim 17, wherein the cost data includes respective, relative times of use of cached documents.

21. The method of claim 17, further comprising selectively bypassing the file cache with the retrieved document in response to the respective number of document requests submitted by the one of the plurality of clients being greater than a selected threshold.

22. The method of claim 17, wherein the cost data for a document in the file cache has a value that is inversely proportional to the respective number of document requests by the client that requested the document at the time the document was placed in the file cache.

23. A system for caching documents requested by a plurality of clients in a file cache, comprising:

means for counting a respective total number of document requests by each client for all documents requested by the client over a selected time interval;

means for caching selected documents requested by the plurality of clients in the file cache;

means for associating with each cached document cost data indicative of the total number of document requests made by the client that requested the document at the time the document was placed in the file cache; and means, responsive to a retrieved document by a document server for a request from one of the plurality of clients for a document not present in the cache, for selecting a document in the cache for replacement as a function of the total number of document requests submitted by the one of the plurality of clients and the cost data associated with each cached document.

24. An article of manufacture, comprising:

a program storage device configured with instructions that are executable by a processor for caching documents requested by a plurality of clients in a file cache by performing the steps including, counting a respective total number of document requests by each client for all documents requested by the client over a selected time interval;

caching selected documents requested by the plurality of clients in the file cache;

associating with each cached document cost data indicative of the total number of document requests made by the client that requested the document at the time the document was placed in the file cache; and in response to a retrieved document by a document server for a request from one of the plurality of clients for a document not present in the cache, selecting a document in the cache for replacement as a function of the total number of document requests submitted by the one of the plurality of clients and the cost data associated with each cached document.

25. The article of manufacture of claim 24, wherein the cost data includes respective sizes of the documents present in the file cache.

26. The article of manufacture of claim 24, wherein the cost data includes respective, relative frequencies of use of cached documents.

27. The article of manufacture of claim 24, wherein the cost data includes respective, relative times of use of cached documents.

28. The article of manufacture of claim 24, wherein the program storage device further includes instructions that are executable by the processor for selectively bypassing the file cache with the retrieved document in response to the respective number of document requests submitted by the one of the plurality of clients being greater than a selected threshold.

29. The article of manufacture of claim 24, wherein the cost data for a document in the file cache has a value that is inversely proportional, to the respective number of document requests by the client that requested the document at the time the document was placed in the file cache.

* * * * *